United States Patent
Corbett

(10) Patent No.: US 8,727,685 B2
(45) Date of Patent: May 20, 2014

(54) SWAGE INDICATING COLLAR

(71) Applicant: Alcoa Inc., Pittsburgh, PA (US)

(72) Inventor: Robert J. Corbett, Woodway, TX (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 13/832,974

(22) Filed: Mar. 15, 2013

(65) Prior Publication Data
US 2013/0202383 A1 Aug. 8, 2013

Related U.S. Application Data

(63) Continuation-in-part of application No. 13/748,851, filed on Jan. 24, 2013.

(60) Provisional application No. 61/594,061, filed on Feb. 2, 2012.

(51) Int. Cl.
*F16B 19/00* (2006.01)

(52) U.S. Cl.
USPC .......................................... 411/361; 411/360

(58) Field of Classification Search
USPC ............................ 411/9, 360, 361, 501, 511
See application file for complete search history.

(56) References Cited

U.S. PATENT DOCUMENTS

| | | | |
|---|---|---|---|
| 2,531,048 A | 11/1950 | Huck | |
| 2,531,049 A | 11/1950 | Huck | |
| 2,764,045 A | 9/1956 | Koenig | |
| 3,029,665 A | 4/1964 | Baugh et al. | |
| 3,215,024 A | 11/1965 | Brilmyer et al. | |
| 3,290,982 A * | 12/1966 | Marschner | 411/39 |
| 3,371,572 A | 3/1968 | King, Jr. | |
| 3,483,788 A | 12/1969 | Keeler | |
| 3,915,053 A | 10/1975 | Ruhl | |
| 4,299,519 A | 11/1981 | Corbett | |

(Continued)

FOREIGN PATENT DOCUMENTS

| | | |
|---|---|---|
| SU | 1097837 A | 5/1982 |
| WO | 9011457 A1 | 10/1990 |

OTHER PUBLICATIONS

International Search Report and Written Opinion issued in connection with applicants' International Patent Application No. PCT/US06/43232 entitled "Low Swage Load Fastening System and Method" (10 pages).

(Continued)

*Primary Examiner* — Roberta Delisle
(74) *Attorney, Agent, or Firm* — Greenberg Traurig, LLP

(57) ABSTRACT

A swage collar including a shank having a first end, a second end opposite the first end, and an outside diameter, a flange extending circumferentially from the first end of the shank and having a outer diameter, and a scalloped shoulder formed at a location where the first end of the shank transitions to the flange. When the swage collar is swaged, the shoulder is deformed from an undeformed state to a deformed state such that the shoulder is blended with the outside diameter of the shank and the outer diameter of the flange. When the shoulder is in its deformed state, it includes multiple curved portions each having a radius of curvature that visually indicates all around the outside diameter of the collar a complete swage of the collar. Knurling located on the outside diameter of the shank and proximate to the second end is deformable and provides a visual indication of the application of an installation tool.

14 Claims, 4 Drawing Sheets

(56) References Cited

U.S. PATENT DOCUMENTS

| | | |
|---|---|---|
| 4,472,096 A | 9/1984 | Ruhl et al. |
| 4,531,871 A | 7/1985 | Sigmund |
| 4,597,263 A | 7/1986 | Corbett |
| 4,813,834 A | 3/1989 | Smith |
| 4,867,625 A | 9/1989 | Dixon |
| 4,878,372 A | 11/1989 | Port et al. |
| 4,921,384 A | 5/1990 | Nordyke |
| 4,943,196 A | 7/1990 | Dahl |
| 5,049,016 A | 9/1991 | Nordyke |
| 5,090,852 A | 2/1992 | Dixon |
| 5,125,778 A | 6/1992 | Sadri |
| 5,315,755 A | 5/1994 | Fulbright et al. |
| 5,548,889 A | 8/1996 | Smith et al. |
| 5,604,968 A | 2/1997 | Fulbright et al. |
| 6,233,802 B1 | 5/2001 | Fulbright |
| 6,325,582 B1 | 12/2001 | Sadri et al. |
| 6,497,024 B2 | 12/2002 | Fulbright |
| 6,702,684 B2 | 3/2004 | Harbin et al. |
| 7,195,438 B2 | 3/2007 | Harbin et al. |
| 7,293,339 B2 | 11/2007 | Mercer et al. |

OTHER PUBLICATIONS

International Search Report and Written Opinion issued in connection with applicants' International Patent Application No. PCT/US13/022872 entitled "Swage Indicating Collar" (10 pages).

* cited by examiner

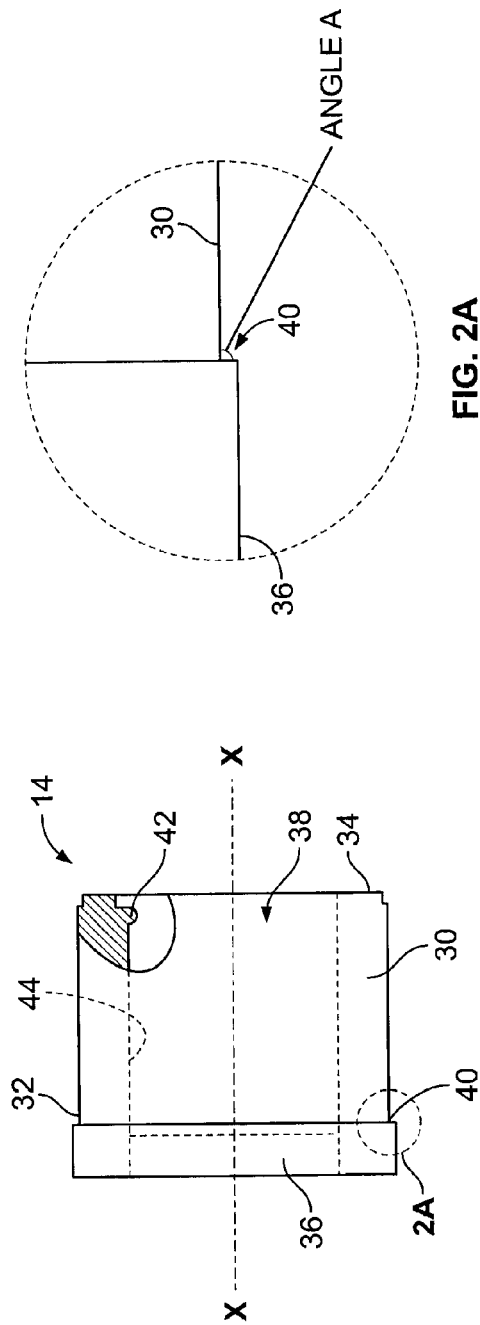

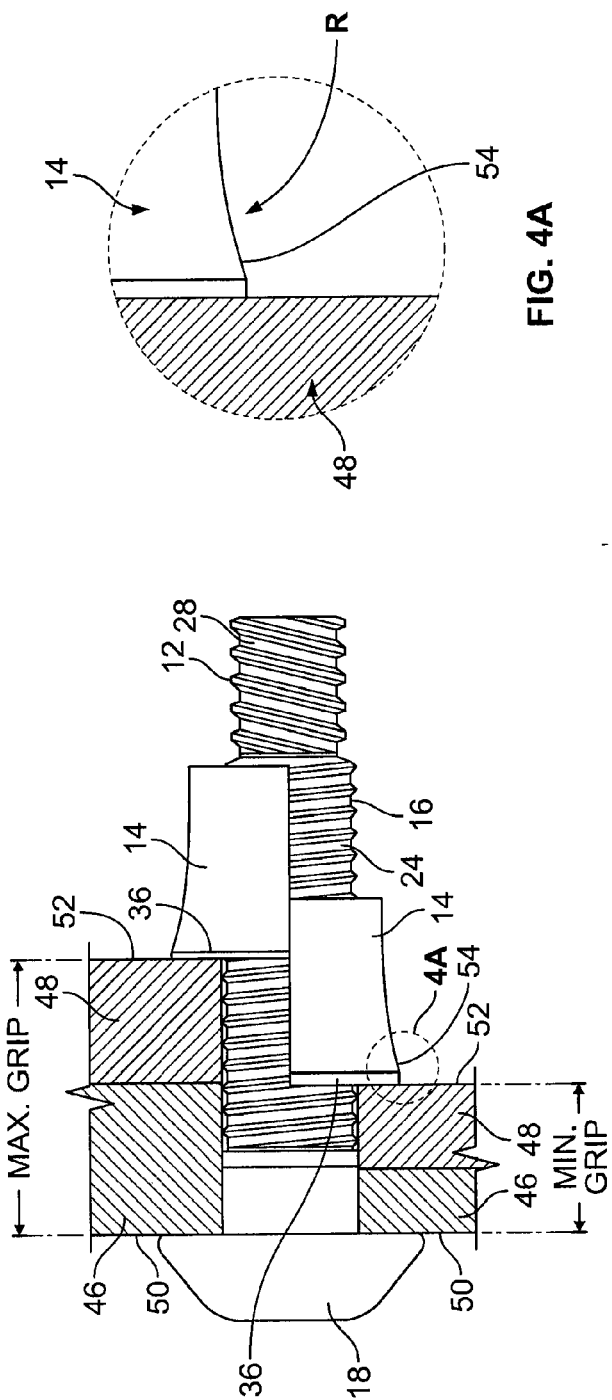
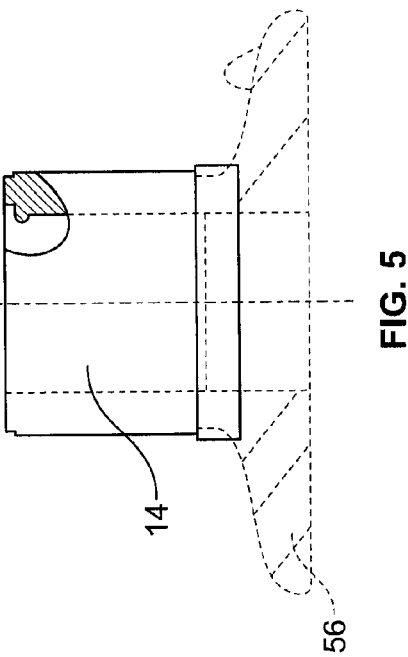
FIG. 4A
FIG. 4
FIG. 5

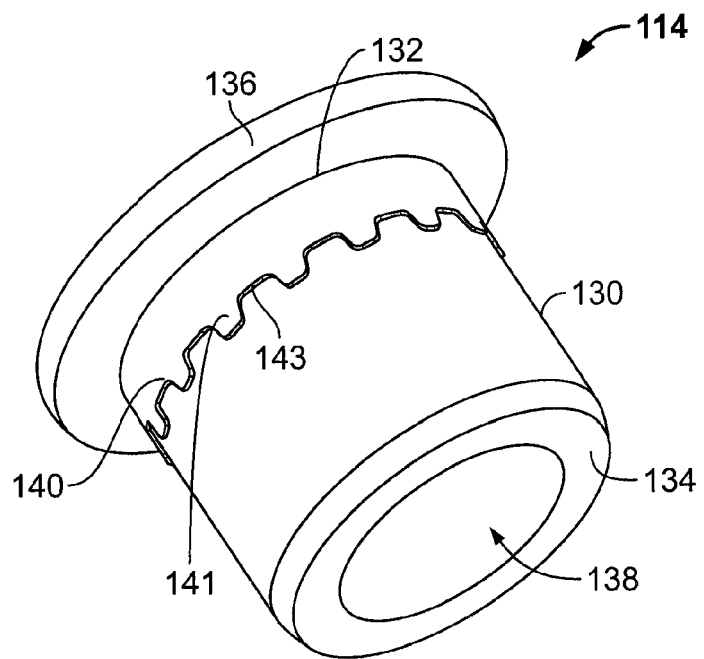
FIG. 6
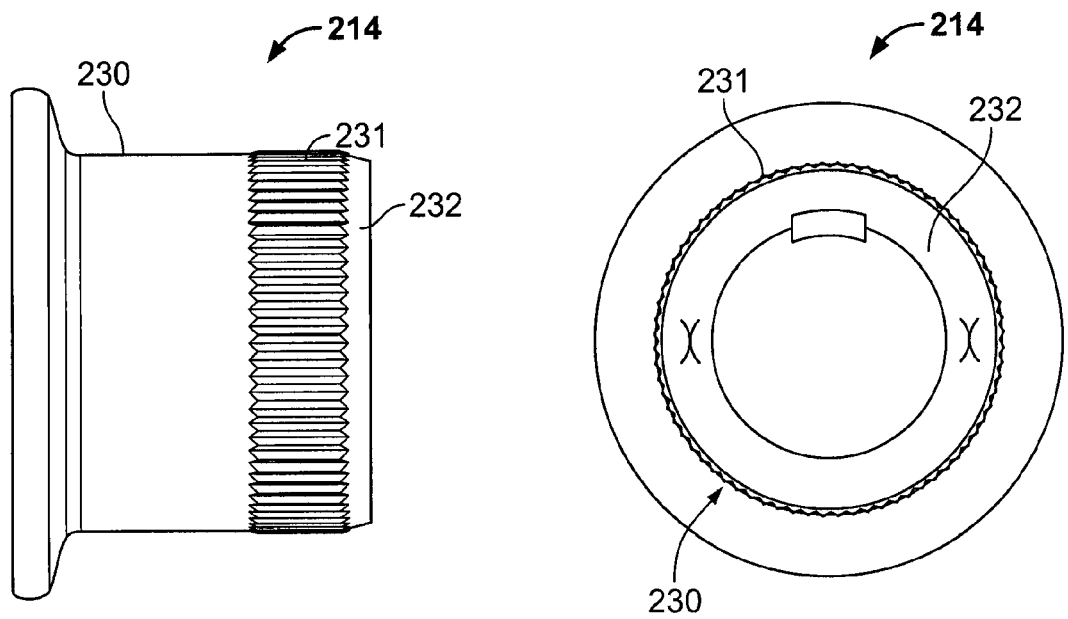
FIG. 7A  FIG. 7B

SWAGE INDICATING COLLAR

CROSS-REFERENCE TO RELATED APPLICATION

The present application is a continuation-in-part of U.S. patent application Ser. No. 13/748,851 entitled SWAGE INDICATING COLLAR, filed on Jan. 24, 2013, the entirety of which is incorporated herein by reference, and which relates to and claims the benefit of U.S. Provisional Patent Application Ser. No. 61/594,061 entitled "SWAGE INDICATING COLLAR," filed Feb. 2, 2012, the entirety of which is incorporated herein by reference.

FIELD OF THE INVENTION

The present invention relates to fasteners and, more particularly, a fastener including a swage indicating collar.

BACKGROUND OF THE INVENTION

Two-piece swaged fasteners, commonly referred to as lockbolts, are used to secure a plurality of workpieces together. Typically swage-type fasteners include a pin member having lock grooves and a swage collar adapted to be swaged into the lock grooves of the pin member by a fastener installation tool. The collar may include a built-in washer or a flange, which supports high clamp load in workpieces made from soft steels or aluminum without embedment. In many applications, the collar is installed against medium to high strength steel, which do not require as much bearing area as required for soft steels and aluminum. The collar may also include raised inspection dots extending from the collar flange that are marked by the installation tool to visually indicate a complete swage of the collar and installed properties. What is needed is a swage collar that utilizes less material, while providing adequate bearing area and a visual indication of a complete swage.

SUMMARY OF THE INVENTION

In an embodiment, a swage collar includes a shank having a first end, a second end opposite the first end, and an outside diameter; a flange extending circumferentially from the first end of the shank and having an outer diameter; and a scalloped shoulder formed at a location proximate to where the first end of the shank transitions to the flange, wherein the swage collar is adapted to be swaged, and wherein when the swage collar is swaged, the shoulder is deformed from an undeformed state to a deformed state wherein the shoulder is blended with the outside diameter of the shank and the outer diameter of the flange. In an embodiment, the shoulder is in its deformed state, the transition step includes a curved portion. In an embodiment, the curved portion includes a radius of curvature. In an embodiment, the shank includes a bore extending from the first end to the second end of the shank, an inner surface defined by the bore, and a fit-up tab extending from the inner surface. In an embodiment, the swage collar further comprises at least one material selected from the group consisting of low carbon steel, annealed low carbon steel, and unannealed low carbon steel. In an embodiment, the swage collar is as-headed. In an embodiment, the shank includes knurling formed circumferentially on the outside diameter and proximate to the second end thereof.

In an embodiment, a fastener including a pin member having an elongated shank portion which terminates at one end in a head and includes a threaded portion having a plurality of threads with lock grooves; and a swage collar including a shank having a first end, a second end opposite the first end, and an outside diameter, a flange extending circumferentially from the first end of the shank of the swage collar and having an outer diameter, and a scalloped shoulder formed at a location where the first end of the shank transitions to the flange, wherein the swage collar is adapted to be swaged onto the lock grooves of the threaded portion of the pin member, and wherein when the swage collar is swaged, the shoulder is deformed from an undeformed state to a deformed state wherein the shoulder is blended with the outside diameter of the shank of the swage collar and the outer diameter of the flange.

In an embodiment, a swage collar including a shank having a first end, a second end opposite the first end, an outside diameter, and knurling formed circumferentially on the outside diameter and proximate to the second end thereof; a flange extending circumferentially from the first end of the shank and having an outer diameter; and a transition step formed at a location where the first end of the shank transitions to the flange, wherein the swage collar is adapted to be swaged, and wherein when the swage collar is swaged, the transition step is deformed from an undeformed state to a deformed state wherein the transition step is blended with the outside diameter of the shank and the outer diameter of the flange.

BRIEF DESCRIPTION OF THE DRAWINGS

FIG. 2 is a side elevational view of a swage collar employed by the fastener shown in FIG. 1;

FIG. 2A is an enlarged view showing detail 2A in FIG. 2;

FIG. 3 is a top plan view of the swage collar shown in FIG. 2;

FIG. 4 is a side, partial cross-sectional view of the fastener shown in FIG. 1 in an installed position, a portion a collar being shown in a minimum grip position, and a portion of another similar collar shown in a maximum grip position for the purposes of comparison;

FIG. 4A is an enlarged view showing detail 4A in FIG. 4;

FIG. 5 is side elevational view of the swage collar shown in FIG. 2, as compared to and superimposed with a flange portion of an existing collar of comparable size, which is shown in phantom;

FIG. 6 is a perspective view of a swage collar constructed in accordance with another embodiment; and FIGS. 7A and 7B are side and front elevational views, respectively, of a swage collar constructed in accordance with another embodiment.

DETAILED DESCRIPTION OF THE DRAWINGS

Figure 1:
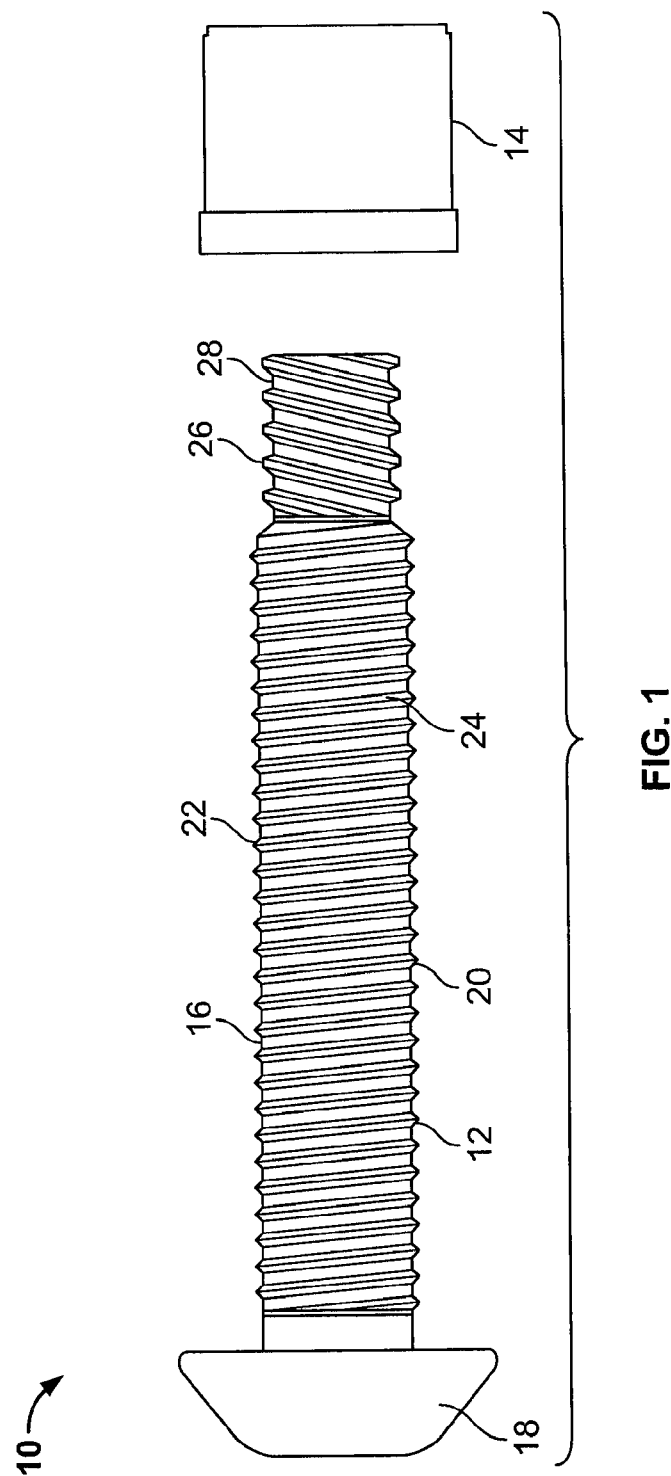
FIG. 1 is an exploded, side elevational view of a fastener constructed in accordance with an embodiment of the present invention.

Referring to FIG. 1, in an embodiment, a fastener 10 including a pin member 12 and a swage collar 14 that is sized and shaped to mate with and be swaged onto the pin member 12. In an embodiment, the pin member 12 includes an elongated shank portion 16 which terminates at one end in a head 18. In an embodiment, the shank portion 16 includes a threaded portion 20 having a plurality of threads 22 with lock grooves 24, and a pull portion 26 having a plurality of pull grooves 28. In an embodiment, the pin member 12 is made from medium carbon alloy steel. In an embodiment, the pin member 12 is a Grade 8 strength level bolt. In other embodiments, the pin member 12 can be characterized by any grade known in the art, such as, for example, Grade 2, Grade 5, Grade 8, Class 8.8, and Class 10.9. In other embodiments, the pin member 12 may be made from other suitable materials known in the art. In other embodiments, the pin member 12 can consist of any of the pin members as disclosed and described in U.S. Pat. No. 7,293,339 to Mercer et al., which is incorporated by reference herein in its entirety.

Referring to FIGS. 2, 2A and 3, the swage collar 14 includes a tubular-shaped shank 30 having a first end 32 and a second end 34 opposite the first end 32, a flange 36 extending circumferentially from and at the first end 32, and a through bore 38 extending from the first end 32 to the second end 34. In an embodiment, the shank 30 includes a generally uniform, cylindrical configuration. In an embodiment, in an undeformed state, the swage collar 14 includes an abrupt transition step or shoulder 40 formed at a location where the first end 32 of the shank 30 transitions to the flange 36. In an embodiment, in an undeformed state, the transition step 40 is linear or substantially linear. In an embodiment, in an undeformed state, the transition step 40 is oriented at an Angle A of about 90 degrees from longitudinal axis X-X of the swage collar 14 (see FIG. 2A). In another embodiment, in an undeformed state, the transition step 40 is oriented at Angle A of about 120 degrees from axis X-X. In another embodiment, in an undeformed state, the transition step 40 is oriented at Angle A of about 135 degrees from axis X-X. In another embodiment, in an undeformed state, the transition step is oriented at Angle A falling within a range of about 90 degrees to about 135 degrees from axis X-X. In an embodiment, in an undeformed state, the transition step 40 visually indicates and differentiates the first and second ends 32, 34 of the collar 14 for installation.

In an embodiment, the swage collar 14 includes an internal fit-up tab 42 extending from an inner surface 44 of the collar 14. In an embodiment, the fit-up tab 42 includes a single thread, such as that shown in U.S. Pat. No. 4,867,625 to Dixon, which is incorporated by reference herein in its entirety. In an embodiment, the fit-up tab 42 is positioned proximate to the second end 34 of the shank 30 of the swage collar 14. In another embodiment, the fit-up tab 42 is positioned proximate to the first end 32 of the shank 30 of the swage collar 14. The purpose and function of the fit-up tab 42 shall be described below. In another embodiment, the swage collar 14 need not include the fit-up tab 42.

In an embodiment, the swage collar 14 is made of low carbon steel. In another embodiment, the swage collar 14 is made from unannealed low carbon steel. In another embodiment, the swage collar 14 is made from annealed low carbon steel. In another embodiment, the swage collar 14 is "as-headed" and does not require thermal processing, as disclosed and described in aforesaid U.S. Pat. No. 7,293,339 to Mercer et al. As employed herein, the term "as-headed" refers to a collar which is strain hardened, for example, from cold working, rather than changing hardness using a thermal process (e.g., quench and tempering; stress relieving; etc.).

Referring to FIG. 4, in an embodiment, the swage collar 14 and the pin member 12 are adapted to secure a plurality of workpieces 46, 48 together. In an embodiment, the shank portion 16 of the pin member 12 is inserted through holes of the workpieces 46, 48, with the head 18 abutting one side 50 of the workpiece 46 and the shank portion 16 extending outwardly from one side 52 of the workpiece 48. In an embodiment, the swage collar 14 is fitted on the shank portion 16 of the pin member 12, whereby the shank portion 16 is inserted within the through bore 38 of the collar 14 (as shown in FIGS. 2 and 3) and the fit-up tab 42 threadedly engages the threads 22 of the pin member 12 to initially retain the collar 14 on the pin member 12. In an embodiment, the swage collar 14 is fitted on the pin member 12 until the flange 36 of the collar 14 abuts the side 52 of the workpiece 48.

In an embodiment, the pull grooves 28 of the pin member 12 are adapted to be gripped by matching teeth of chuck jaws of a fastener installation tool having a swage anvil (not shown in the Figures). In an embodiment, the fastener installation tool may consist of the tools disclosed and described in aforesaid U.S. Pat. No. 7,293,339 to Mercer et al. In an embodiment, the swage anvil of the tool is adapted to engage the swage collar 14 and apply a relative axial force between the collar 14 and the pin member 12, and to move over the collar 14 and swage it into the lock grooves 24 of the pin member 12 (not shown in the Figures). In an embodiment, during the installation process, the transition step 40 of the collar 14 (shown in FIGS. 2 and 2A) is swaged and deforms inwardly to a deformed state. FIG. 4 shows the collar 14 fully installed on the pin member 12, showing both the minimum grip when used for securing thinner workpieces 46, 48, and the maximum grip when used for securing thicker workpieces 46, 48. In an embodiment, when the collar 14 is fully and properly installed, the transition step 40 (in its deformed state) is blended into the outside diameter of the collar 14, as shown in FIG. 4, specifically, an outside diameter of the shank 30 and an outer diameter of the flange 36, and is characterized as a smooth, flowing curved portion 54. In an embodiment, the curved portion 54 provides a visual indication that the collar 14 has been completely swaged and installed onto the pin member 12, and that the workpieces 46, 48 are secured to one another. In an embodiment, as shown in FIG. 4A, the curved portion 54 has a radius of curvature R. In an embodiment, for a ½ inch fastener 10, the radius of curvature R is about 0.476 inch. In an embodiment, for a ⅝ inch fastener 10, the radius of curvature R is about 0.595 inch. In an embodiment, for a ¾ inch fastener 10, the radius of curvature R is about 0.714 inch. When fully installed, the flange 36 is sized and shaped to provide an adequate bearing area to support the retained clamp load without embedment of the collar 14 in the workpiece 48. In an embodiment, because of the reduced size of the flange 36, the amount of material required to make the collar 14 is less than that required for a comparable flanged collar 56 known in the art, as shown in phantom in FIG. 5. In an embodiment, a material reduction of about 10 to 15% is obtained.

FIG. 6 illustrates a swage collar 114 in accordance with another embodiment. The swage collar 114 is structured and functions similar to the collar 14 with the following differences. In an embodiment, the swage collar 114 includes a tubular-shaped shank 130 having a first end 132 and a second end 134 opposite the first end 132, a flange 136 extending circumferentially from and at the first end 132, and a through bore 138 extending from the first end 132 to the second end 134. In an embodiment, the shank 130 includes a scalloped/wavy shoulder 140 that extends from the first end 132 to an area intermediate the first and second ends 132, 134. In an embodiment, the shoulder 140 includes a plurality of peaks 141 and a plurality of valleys 143 that alternate with one another, as shown in FIG. 6 which impart visually multiple sections of the shoulder 140. In an embodiment, the peaks 141 and the valleys 143 of the shoulder 140 form a trapezoidal wave shape. In other embodiments, the peaks 141 and the valleys 143 of the shoulder 140 can consist of other shapes and sizes. In an embodiment, during the installation process, the shoulder 140 of the collar 114 is swaged and deforms inwardly to a deformed state. In an embodiment, when the collar 114 is fully and properly installed, the shoulder 140 (in its deformed state), and particularly the peaks 141 and the valleys 143, are blended into the outside diameter of the collar 114, and characterized by multiple smooth, flowing curved portions therearound (not shown in the Figures). In an embodiment, the curved portions provide various points of visual indication all around the outside diameter of the collar 114 that the collar 114 has been completely swaged and installed onto a pin member and that the workpieces are secured to one another. If one or more of the peaks 141 and/or the valleys 143 are not blended into the outside diameter of the collar 114, this provides a visual indication that the collar 114 has not been completely swaged.

FIG. 7 illustrates a swage collar 214 in accordance with another embodiment. The swage collar 214 is structured and functions similar to the collar 14, except that a shank 230 includes knurling 231 formed circumferentially on the outside diameter thereof and located proximate to a second end 234 of the shank 230. The knurling 231 is deformable when an installation tool is applied thereon, even in the event that the tool does not completely swage the collar 214, thus providing a visual indication of whether the tool was applied at all thereto. In an embodiment, the collar 114 shown in FIG. 6 and described above includes the knurling 231 (not shown in the Figures).

It should be understood that the embodiments described herein are merely exemplary and that a person skilled in the art may make many variations and modifications without departing from the spirit and scope of the invention. All such variations and modifications are intended to be included within the scope of the invention as defined in the appended claims.

What is claimed is:

1. A swage collar, comprising:
a shank having a first end, a second end opposite the first end, and an outside diameter;
a flange extending circumferentially from the first end of the shank and having an outer diameter; and
a scalloped shoulder formed at a location proximate to where the first end of the shank transitions to the flange, wherein the shoulder includes a plurality of peaks and a plurality of valleys, wherein each of the plurality of peaks extends non-radially in a direction towards the second end of the shank, and each of the plurality of valleys extends non-radially in a direction towards the first end of the shank,
wherein the swage collar is adapted to be swaged, and wherein when the swage collar is swaged, each of the plurality of peaks and each of the plurality of valleys of the shoulder is deformed from an undeformed state to a deformed state wherein each of the plurality of peaks and each of the plurality of valleys of the shoulder is blended with the outside diameter of the shank and the outer diameter of the flange.

2. The swage collar of claim 1, wherein when each of plurality of peaks and each of the plurality of valleys of the shoulder is in its deformed state, the shoulder includes a curved portion.

3. The swage collar of claim 2, wherein the curved portion includes a radius of curvature.

4. The swage collar of claim 1, wherein the shank includes a bore extending from the first end to the second end of the shank, an inner surface defined by the bore, and a fit-up tab extending from the inner surface.

5. The swage collar of claim 1, wherein the swage collar further comprises at least one material selected from the group consisting of low carbon steel, annealed low carbon steel, and unannealed low carbon steel.

6. The swage collar of claim 1, wherein the swage collar is as-headed.

7. The swage collar of claim 1, wherein the shank includes knurling formed circumferentially on the outside diameter and proximate to the second end thereof.

8. A fastener, comprising:
a pin member having an elongated shank portion which terminates at one end in a head and includes a threaded portion having a plurality of threads with lock grooves; and
a swage collar including a shank having a first end, a second end opposite the first end, and an outside diameter, a flange extending circumferentially from the first end of the shank of the swage collar and having an outer diameter, and a scalloped shoulder formed at a location where the first end of the shank transitions to the flange, wherein the shoulder includes a plurality of peaks and a plurality of valleys, wherein each of the plurality of peaks extends non-radially in a direction towards the second end of the shank, and each of the plurality of valleys extends non-radially in a direction towards the first end of the shank,
wherein the swage collar is adapted to be swaged onto the lock grooves of the threaded portion of the pin member, and wherein when the swage collar is swaged, each of the plurality of peaks and each of the plurality of valleys of the shoulder is deformed from an undeformed state to a deformed state wherein each of the plurality of peaks and each of the plurality of valleys of the shoulder is blended with the outside diameter of the shank of the swage collar and the outer diameter of the flange.

9. The fastener of claim 8, wherein when each of the plurality of peaks and each of the plurality of valleys of the shoulder is in its deformed state, the shoulder includes a curved portion.

10. The fastener of claim 9, wherein the curved portion includes a radius of curvature.

11. The fastener of claim 10, wherein the shank of the swage collar includes a bore extending from the first end to the second end of the shank, an inner surface defined by the bore, and a fit-up tab extending from the inner surface.

12. The fastener of claim 11, wherein the swage collar further comprises at least one material selected from the group consisting of low carbon steel, annealed low carbon steel, and unannealed low carbon steel.

13. The fastener of claim 12, wherein the swage collar is as-headed.

14. The swage collar of claim 8, wherein the shank of the collar includes knurling formed circumferentially on the outside diameter and proximate to the second end thereof.

* * * * *

UNITED STATES PATENT AND TRADEMARK OFFICE
CERTIFICATE OF CORRECTION

PATENT NO. : 8,727,685 B2  
APPLICATION NO. : 13/832974  
DATED : May 20, 2014  
INVENTOR(S) : Robert J. Corbett Page 1 of 1

It is certified that error appears in the above-identified patent and that said Letters Patent is hereby corrected as shown below:

In the Claims

In Claim 14, Column 6, line 55, delete "swage collar" and insert --fastener--.

Signed and Sealed this  
Third Day of March, 2015

Michelle K. Lee  
*Deputy Director of the United States Patent and Trademark Office*